(12) United States Patent
Chen et al.

(10) Patent No.: US 7,920,054 B2
(45) Date of Patent: Apr. 5, 2011

(54) BICYCLE METER ASSEMBLY WITH POSITIONING FUNCTION

(75) Inventors: Yi-Lun Chen, Taipei (TW); Wen-Pin Weng, Jhonghe (TW)

(73) Assignee: Yi-Lun Chen, Taipei (TW)

( * ) Notice: Subject to any disclaimer, the term of this patent is extended or adjusted under 35 U.S.C. 154(b) by 324 days.

(21) Appl. No.: 12/292,356

(22) Filed: Nov. 18, 2008

(65) Prior Publication Data
US 2010/0123566 A1   May 20, 2010

(51) Int. Cl.
*B62J 6/00*   (2006.01)
(52) U.S. Cl. .................. 340/432; 340/425.5; 340/426.1; 340/426.19; 340/427; 340/435; 340/436; 340/440; 340/566; 180/282; 180/283; 180/284
(58) Field of Classification Search .................. 340/432, 340/425.5, 426.1, 426.19, 427, 435, 436, 340/440, 566; 180/282, 283, 284
See application file for complete search history.

(56) References Cited

U.S. PATENT DOCUMENTS

| | | | |
|---|---|---|---|
| 6,608,553 B2 * | 8/2003 | Isobe | 340/426.1 |
| 6,791,456 B2 * | 9/2004 | Nakayama et al. | 340/429 |
| 7,567,166 B2 * | 7/2009 | Bourgine De Meder | 340/432 |

* cited by examiner

*Primary Examiner* — Tai T Nguyen
(74) *Attorney, Agent, or Firm* — Rosenberg, Klein & Lee

(57) ABSTRACT

A bicycle meter assembly with locating function includes a sensor module and a receiver module. The sensor module includes a microprocessor, a sensing unit, a display unit, a keypad, an encoder, and a wireless transceiver. The receiver module includes a wireless receiver, a decoder, and a warning unit. The sensor module and the receiver module are separately installed on a bicycle at two selected positions. The sensor module senses and displays traveling information and user's body signals that are generated when the bicycle is moving. When the user wants to locate the bicycle being parked at a selected place, the keypad can be pressed to generate a call signal, which is sent to the receiver module for the warning unit to emit a warning signal.

8 Claims, 6 Drawing Sheets

BICYCLE METER ASSEMBLY WITH POSITIONING FUNCTION

FIELD OF THE INVENTION

The present invention relates to a bicycle meter assembly, and more particularly to a bicycle meter assembly that displays traveling information when the bicycle is moving and provides a positioning function when the bicycle is parked at some place.

BACKGROUND OF THE INVENTION

With the increasing fuel price, more and more people living in the modern society choose not to drive a car or ride a motorcycle so frequently, so as to achieve the purpose of saving money and energy and reducing carbon. Riding bicycle and taking public transportation are two alternatives for driving cars and riding motorcycles. Particularly, the bicycle is not only a convenient traffic means, but also an ideal exercise apparatus. Therefore, various types of bicycle meters for sensing a bicycle's traveling information and a rider's body signals have been developed.

Most of the currently available bicycle meters include a sensor installed near a wheel or a braking device of the bicycle. By multiplying a given wheel size by the number of turns of the wheel, a user can know the distance by which the bicycle has moved.

Taiwan Patent Publication No. M327829 discloses an integrated control device for mounting on a bicycle having at least one lamp. The integrated bicycle control device includes a keypad, a microprocessor, a wireless transceiver, and a display unit. The microprocessor is electrically connected to the keypad for receiving signals generated by pressing the keys of the keypad and sending out a driving signal accordingly. The driving signal is then transmitted by the wireless transceiver to another wireless transceiver mounted on the lamp of the bicycle for controlling the on/off of the lamp. The display unit is electrically connected to the microprocessor for displaying the on/off state of the lamp on the bicycle.

Generally, a car or a motorcycle has a burglarproof device integrated with a remotely control lock. Since a relatively high amount of current is consumed by such a burglarproof lock, a relatively large battery is required to supply sufficient electric current. However, the large battery for the burglarproof lock would occupy a quite large room on a bicycle and increase an overall weight of the bicycle. U.S. Pat. No. 6,690,267 discloses a remotely controllable bicycle lock and alarm system, which includes a remote control device and an integrated lock and alarm device. The remote control device is operated by a user to generate a remote control signal to the integrated lock and alarm device. At this point, the integrated lock and alarm device automatically locks the bicycle to provide the antitheft function. In the event the bicycle is touched by someone else, the integrated lock and alarm device will emit a warning sound to notify the user.

The integrated bicycle control device disclosed in Taiwan Patent Publication No. M327829 is designed only to control and display the on/off state of the bicycle lamp, and the remotely controllable bicycle lock and alarm system disclosed in U.S. Pat. No. 6,690,267 is designed only to protect the bicycle against theft. Both of the two inventions do not provide other sensing functions. Therefore, a user has to expense additional money to purchase other sensing devices for mounting on the bicycle to achieve other required sensing functions.

SUMMARY OF THE INVENTION

A primary object of the present invention is to provide a bicycle meter assembly with positioning function, so that traveling information of a bicycle and a user's body signals can be sensed and displayed on a sensor module when the user rides the bicycle.

Another object of the present invention is to provide a bicycle meter assembly with positioning function, so that a bicycle parked at a certain spot can be quickly located by pressing a bicycle positioning button on a sensor module carried by a user to generate a call signal for a receiver module installed on the bicycle to emit a warning signal.

To achieve the above and other objects, the bicycle meter assembly with positioning function according to the present invention includes a sensor module and a receiver module. The sensor module includes a microprocessor, a sensing unit, a display unit, a keypad, an encoder, and a wireless transceiver. The receiver module includes a wireless receiver, a decoder, and a warning unit. The sensor module and the receiver module are separately installed on a bicycle at two selected positions. The sensing unit of the sensor module senses a set of traveling information when the bicycle is moving. The sensed traveling information is then displayed on the display unit via the microprocessor.

When the user wants to locate the bicycle being parked at a selected spot, the keypad of the sensor module can be pressed to generate a bicycle positioning signal, which is encoded by the encoder to produce a call signal. The encoded call signal is sent by the microprocessor to the wireless transceiver and transmitted to the receiver module.

The call signal received by the wireless receiver of the receiver module is decoded by the decoder into a trigger signal for triggering the warning unit to emit a warning signal.

With the technical means adopted by the present invention, traveling information of the bicycle being ridden by the user can be sensed by the sensing unit and displayed on the display unit. Therefore, the user can know the riding speed, the riding distance, and the riding time at any time while riding the bicycle.

Since the bicycle meter assembly of the present invention also provides the positioning function, the user can quickly locate the bicycle being parked at some place, particularly when the bicycle is parked at a crowded region, such as in a campus or near a bus/train station or a rapid transport station. That is, with the present invention, the user can quickly locate his or her bicycle in a crowded environment without consuming a lot of time.

Moreover, since the present invention integrates a sensor and a locating device into one unit, the user can save the money that is otherwise needed to purchase an additional locating device.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
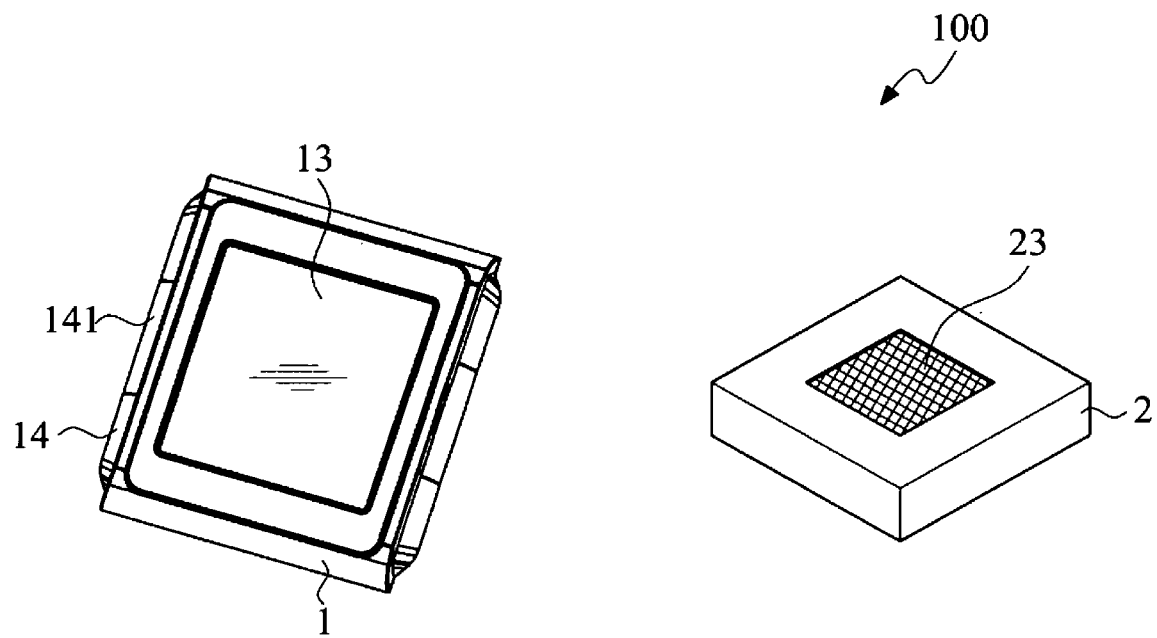
FIG. 1 is a perspective view of a bicycle meter assembly of the present invention.
Figure 2:
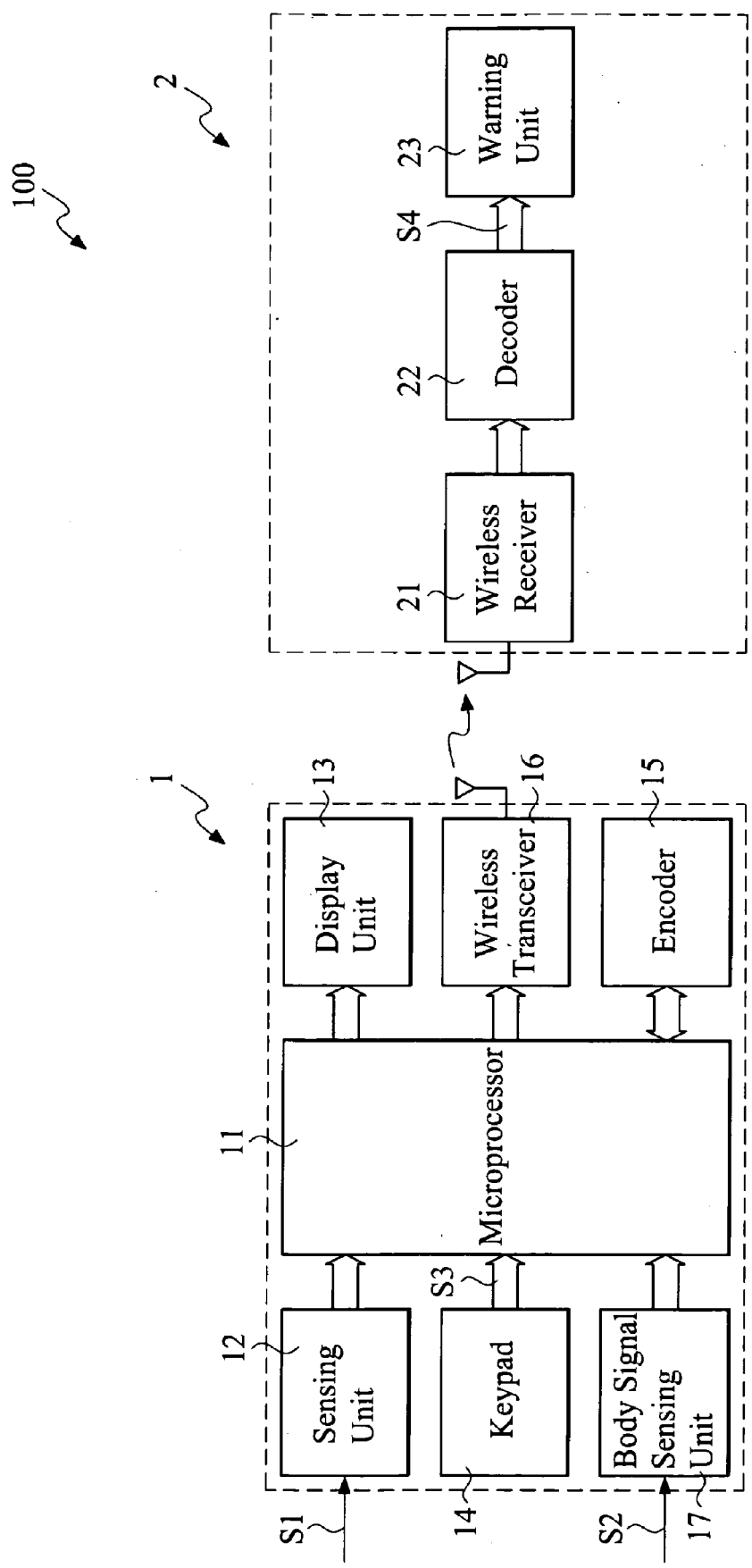
FIG. 2 is a block diagram showing the internal circuit design of a bicycle meter assembly according to a first embodiment of the present invention.

Please refer to FIG. 1 that is a perspective view showing a bicycle meter assembly 100 of the present invention having a sensor module 1 and a receiver module 2, and to FIG. 2 that is a block diagram showing the internal circuit design for the sensor module 1 and the receiver module 2 of a bicycle meter assembly 100 according to a first embodiment of the present invention.

As shown, in the bicycle meter assembly 100 according to the first embodiment of the present invention, the sensor module 1 includes a microprocessor 11, a sensing unit 12, a display unit 13, a keypad 14, an encoder 15, a wireless transceiver 16, and a body signal sensing unit 17. The sensing unit 12 is used to sense a set of traveling information S1 of a bicycle on which the bicycle meter assembly 100 is installed. The microprocessor 11 retrieves the sensed traveling information S1 and sends the same to the display unit 13 for displaying.

The keypad 14 of the sensor module 1 includes a bicycle positioning button 141. When the bicycle positioning button 141 is pressed, a call signal S3 is generated. The encoder 15 encodes the call signal S3 generated by the bicycle positioning button 141, and sends the encoded call signal S3 to the microprocessor 11. The wireless transceiver 16 transmits the encoded call signal S3 to the receiver module 2. The body signal sensing unit 17 is used to sense a set of body signals S2 of a user riding the bicycle having the bicycle meter assembly 100 of the present invention installed thereon, and the sensed body signals S2 are forwarded by the microprocessor 11 to the display unit 13 for displaying.

The receiver module 2 includes a wireless receiver 21, a decoder 22, and a warning unit 23. The receiver 21 of the receiver module 2 is used to receive the call signal S3 transmitted by the sensor module 1. The call signal S3 received by the wireless receiver 21 is sent to the decoder 22 and decoded. The warning unit 23 is used to emit a warning signal. In the first embodiment of the present invention, the warning unit 23 can be a buzzer or an indicator lamp.

Figure 3:
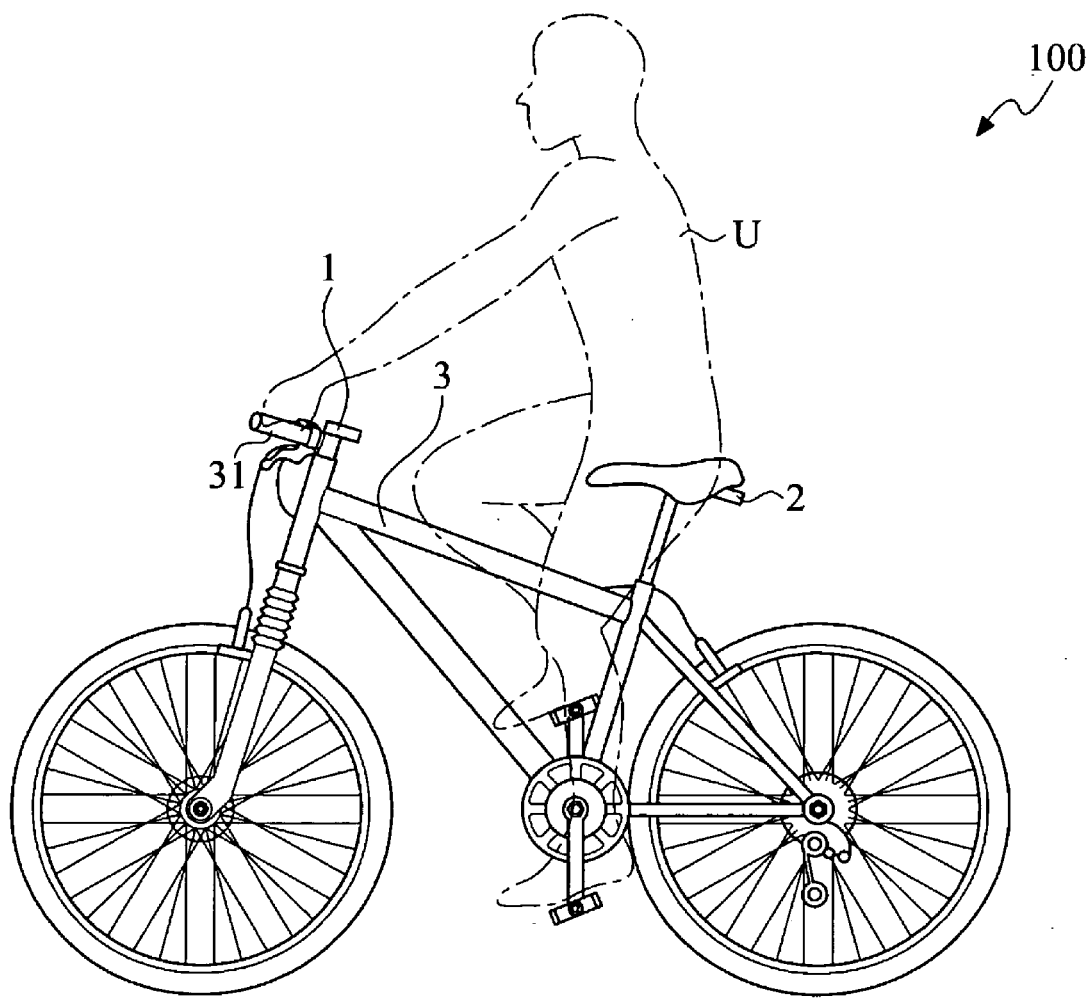
FIG. 3 schematically shows a first example of application of the bicycle meter assembly of the present invention.

FIG. 3 schematically shows a first example of application of the bicycle meter assembly 100 according to the first embodiment of the present invention. The sensor module 1 and the receiver module 2 of the bicycle meter assembly 100 are separately installed on a bicycle 3 at two selected positions. In the illustrated embodiment, the sensor module 1 is installed on a handlebar 31 of the bicycle 3 near a middle area thereof, and the receiver module 2 is installed on a lower rear end of a saddle of the bicycle 3. Alternatively, the sensor module 1 and the receiver module 2 can be installed at other suitable positions on the bicycle 3 by a user U according to actual need.

Figure 4:
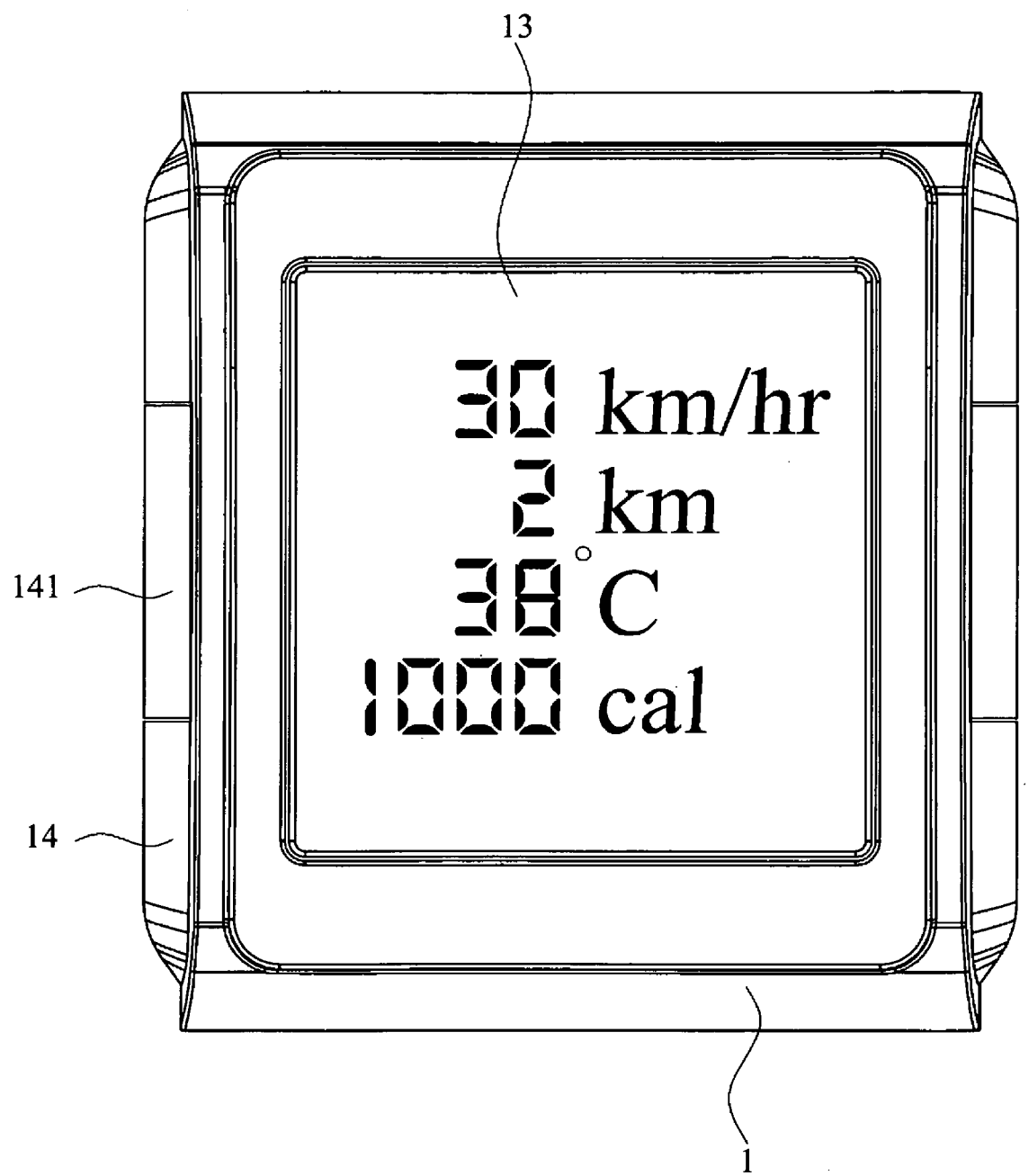
FIG. 4 shows a sensor module of the bicycle meter assembly of the present invention for displaying different traveling information and body signals thereon.

Please refer to FIGS. 2, 3, and 4 at the same time. When the user U rides the bicycle 3, the sensor module 1 installed on a middle area of the handlebar is adapted to sense a set of traveling information S1 from the bicycle 3. The set of traveling information S1 varies with the user's riding speed. Meanwhile, the body signal sensing unit 17 is adapted to sense a set of body signals S2 generated by the user U while riding the bicycle 3. The set of traveling information S1 can include speed information, distance information, and time information. And, the body signals S2 can include one or both of a body temperature signal and a calorie consumption signal.

As can be seen from FIG. 2, when the sensing unit 12 and the body signal sensing unit 17 of the sensor module 1 sense the traveling information S1 of the bicycle 3 and the user's body signals S2, respectively, the microprocessor 11 will retrieve the traveling information S1 and the body signals S2 from the sensing unit 12 and the body signal sensing unit 17, respectively, and send the retrieved traveling information S1 and body signals S2 to the display unit 13 for displaying. The display unit 13 can display the traveling information S1, including speed information, distance information, and time information, and/or the user's body signals, including body temperature signal and calorie consumption signal, under the operation by the user U.

Figure 5:
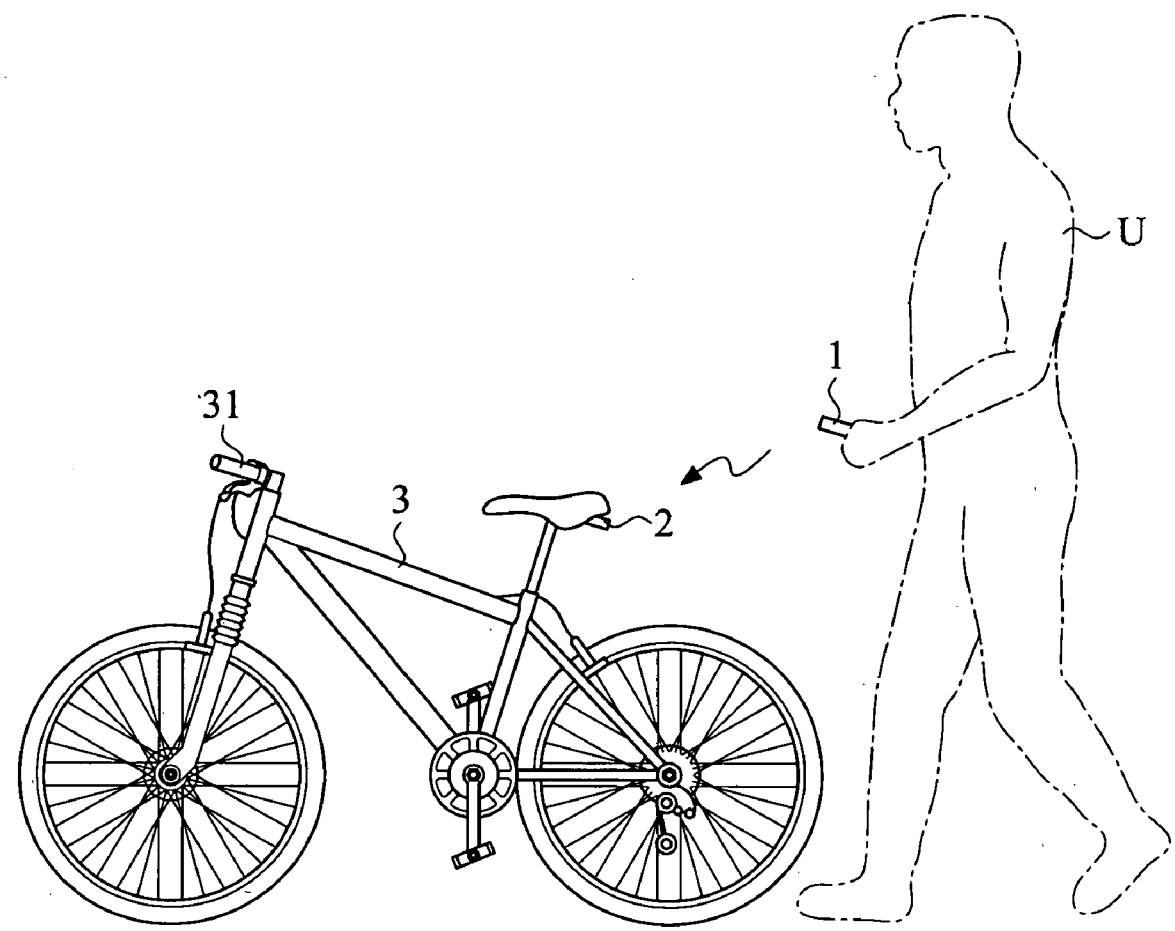
FIG. 5 schematically shows a second example of application of the bicycle meter assembly of the present invention.

FIG. 5 schematically shows a second example of application of the bicycle meter assembly 100 according to the first embodiment of the present invention. When the user U has parked the bicycle 3 at a selected spot, the user U can remove the sensor module 1 from the handlebar of the bicycle 3 and carry the sensor module 1 along with him or her. When the user U returns and wants to locate his or her bicycle 3, he or she can approach the selected spot and press the bicycle positioning button 141 of the keypad 14 on the sensor module 1 at a preset distance from the bicycle 3. At this point, as shown in FIGS. 2 and 5, the keypad 14 being pressed by the user U generates a call signal S3, which is transmitted by the microprocessor 11 to the encoder 15 and encoded. The encoded call signal is sent to the wireless transceiver 16 via the microprocessor 11, and then transmitted by the wireless transceiver 16 to the receiver module 2.

When the receiver 21 of the receiver module 2 receives the encoded call signal from the sensor module 1, the decoder 22 of the receiver module 2 decodes the received call signal into a trigger signal S4, which triggers the warning unit 23 to emit a warning signal, such as a buzz emitted by a buzzer or a flashing light emitted by an indicator lamp. In this manner, the user U can quickly locate his or her bicycle 3.

Figure 6:
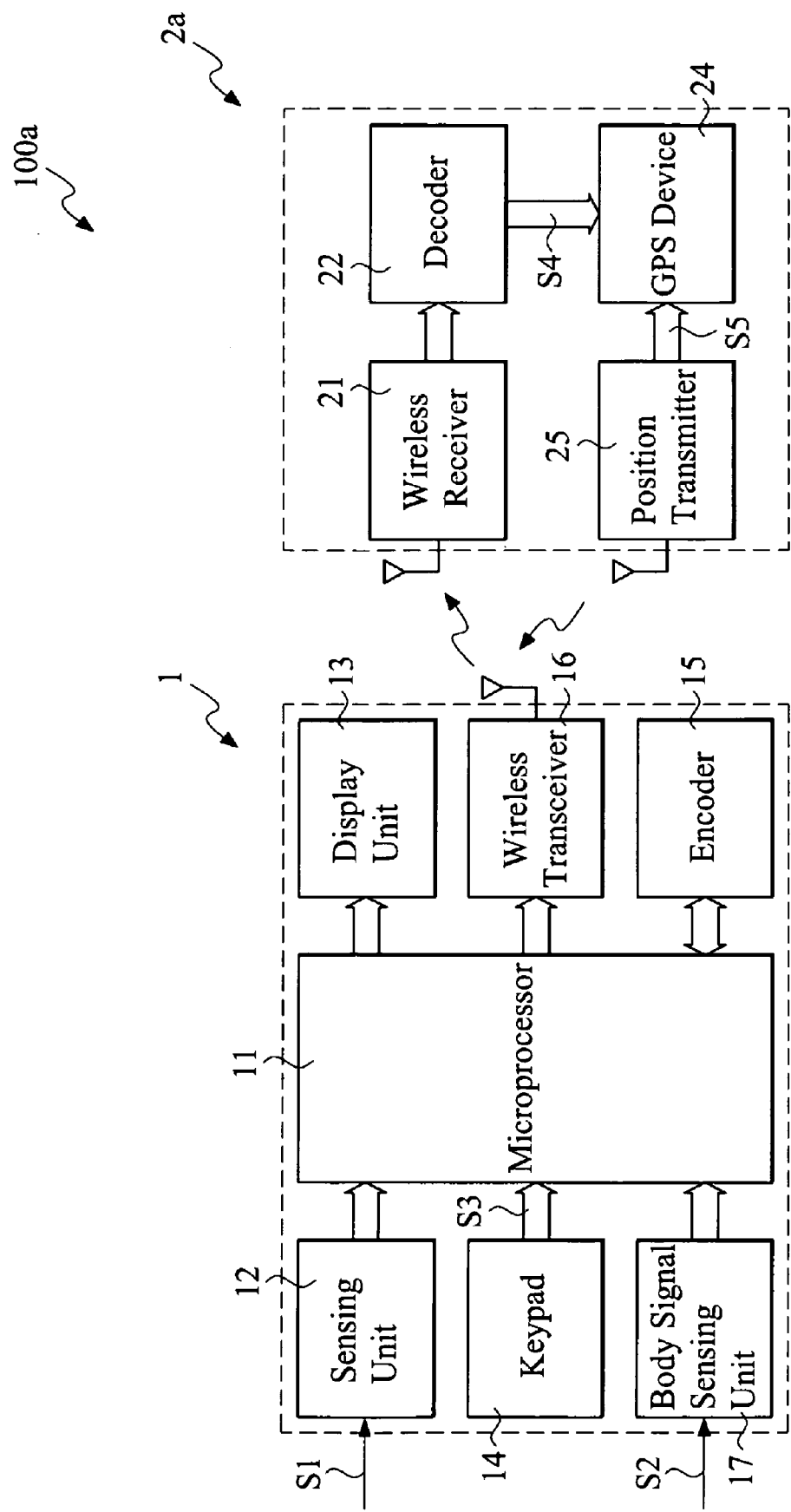
FIG. 6 is a block diagram showing the internal circuit design of a bicycle meter assembly according to a second embodiment of the present invention.

FIG. 6 is a block diagram showing the internal circuit design for the sensor module 1 and the receiver module 2a of a bicycle meter assembly 100a according to a second embodiment of the present invention. Since the bicycle meter assembly 100a in the second embodiment is generally structurally and functionally similar to the first embodiment, components that are the same in the two embodiments are denoted by the same reference numerals. The second embodiment is different from the first embodiment in that a global positioning system (GPS) device 24 and a position transmitter 25 are provided in the receiver module 2.

In the second embodiment, when the receiver module 2a receives a call signal S4 transmitted by the sensor module 1, the decoder 22 of the receiver module 2a decodes the call signal and the decoded call signal is sent to the GPS device 24. At this point, the GPS device 24 will receive positional coordinate information S5, which is then transmitted to the sensor module 1 via the position transmitter 25. When the sensor module 1 receives the positional coordinate information S5, the microprocessor 11 will send the received positional coordinate information S5 to the display unit 13 for displaying.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A bicycle meter assembly for mounting on a bicycle, comprising:
 a sensor module including:
  a microprocessor;
  a sensing unit electrically connected to the microprocessor for sensing a set of traveling information from the bicycle being ridden;
  a display unit electrically connected to the microprocessor for displaying the set of traveling information sensed by the sensing unit;
  a keypad including at least a bicycle positioning button for generating a call signal when the bicycle positioning button is pressed by a user;
  an encoder electrically connected to the microprocessor for encoding the call signal; and
  a wireless transceiver electrically connected to the microprocessor for transmitting the call signal having been encoded by the encoder; and
 a receiver module including:
  a wireless receiver for receiving the call signal transmitted by the wireless transceiver of the sensor module;
  a decoder electrically connected to the wireless receiver for decoding the call signal received by the wireless receiver to generate a trigger signal; and
  a warning unit electrically connected to the wireless receiver and adapted to be triggered by the trigger signal to emit a warning signal.

2. The bicycle meter assembly as claimed in claim 1, wherein the set of traveling information includes time information, speed information, and distance information.

3. The bicycle meter assembly as claimed in claim 1, wherein the warning unit of the receiver module is an indicator lamp.

4. The bicycle meter assembly as claimed in claim 1, wherein the warning unit of the receiver module is a buzzer.

5. The bicycle meter assembly as claimed in claim 1, wherein the sensor module further includes a body signal sensing unit for sensing a set of body signals from a user riding the bicycle.

6. The bicycle meter assembly as claimed in claim 5, wherein the set of body signals includes at least one or both of a body temperature signal and a calorie consumption signal.

7. The bicycle meter assembly with locating function as claimed in claim 1, wherein the receiver module further includes a GPS device for receiving positional coordinate information.

8. The bicycle meter assembly with locating function as claimed in claim 7, wherein the receiver module further includes a position transmitter for transmitting the positional coordinate information to the sensor module.

* * * * *